United States Patent
Merry (10) Patent No.: US 6,254,333 B1
(45) Date of Patent: Jul. 3, 2001

(54) METHOD FOR FORMING A COOLING PASSAGE AND FOR COOLING A TURBINE SECTION OF A ROTARY MACHINE

(75) Inventor: Brian Merry, Middletown, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/365,488

(22) Filed: Aug. 2, 1999

(51) Int. Cl.⁷ .................................................. F01D 9/06
(52) U.S. Cl. .................. 415/115; 415/116; 415/139; 415/180; 29/889.2; 29/889.22; 29/889.721
(58) Field of Search .................... 415/115, 116, 415/138, 139, 180; 416/96 R, 96 A, 97 R, 193 A; 29/889.2, 889.22, 889.721

(56) References Cited

U.S. PATENT DOCUMENTS

| | | |
|---|---|---|
| 3,628,880 | 12/1971 | Smuland et al. . |
| 3,752,598 | * 8/1973 | Bowers et al. ................ 415/139 |
| 4,017,213 | 4/1977 | Przirembel . |
| 4,353,679 | 10/1982 | Hauser . |
| 4,688,988 | 8/1987 | Olsen . |
| 4,767,260 | 8/1988 | Clevenger et al. . |
| 4,902,198 | * 2/1990 | North ................................ 415/115 |
| 4,946,346 | 8/1990 | Ito . |
| 5,167,485 | * 12/1992 | Starkweather .................. 415/115 |
| 5,399,065 | 3/1995 | Kudo et al. . |
| 5,413,458 | 5/1995 | Calderbank . |
| 5,486,090 | 1/1996 | Thompson et al. . |
| 5,488,825 | 2/1996 | Davis et al. . |
| 5,538,393 | 7/1996 | Thompson et al. . |
| 6,017,189 | * 1/2000 | Judet et al. .................... 416/97 R |

* cited by examiner

Primary Examiner—Christopher Verdier
(74) Attorney, Agent, or Firm—Gene D. Fleisehauer (57) ABSTRACT

A method for cooling the trailing edge 126, 146 region of a stator vane platform 48, 54 and for forming a cooling passage 198, 214 using platform slots in the side of a stator vane is disclosed. Various steps are developed which provide for effective cooling with minimal intrusion into the working medium flowpath 18. In one particular embodiment, the method includes extending a feather seal slot rearwardly with an extension 88, 96 in facing sides 116, 118, or 136, 138 of a pair of vane platforms 48, 54 and for flowing cooling fluid laterally prior to discharging the cooling air for impingement cooling of an adjacent stator vane.

19 Claims, 6 Drawing Sheets

METHOD FOR FORMING A COOLING PASSAGE AND FOR COOLING A TURBINE SECTION OF A ROTARY MACHINE

CROSS REFERENCE TO RELATED APPLICATIONS

This application relates to copending U.S. applications Ser. No. 09/366,290 entitled "Stator Vane for a Rotary Machine", by Brian Merry et al.

DESCRIPTION

1. Technical Field

This invention relates to a method for cooling the platform of a stator vane for a rotary machine for cooling structure adjacent to the platform and for forming a cooling passage for such cooling.

2. Background of the Invention

An axial flow rotary machine, such as a gas turbine engine for an aircraft, has a compression section, a combustion section, and a turbine section. An annular flow path for working medium gases extends axially through the sections of the engine.

The engine adds fuel to the working medium gases and burns the fuel in the combustion section to form hot, pressurized gases. The hot, working medium gases are expanded through the turbine section to extract energy as work from the gases. The energy is transferred to the compression section to raise the pressure of the incoming gases.

The turbine section includes a rotor for receiving this work from the hot working medium gases. The rotor extends axially through the engine. The rotor includes a rotor assembly in the turbine section. The rotor also has a rotor assembly in the compression section. The rotor assemblies have arrays of rotor blades which extend outwardly across the working medium flow path through which the gases are directed. Arrays of rotor blades in the turbine section receive energy from the hot, working medium gases and drive the rotor assembly at high speeds about an axis of rotation. Arrays of rotor blades in the compression section transfer energy to the working medium gases to compress the gases as the airfoils are driven about the axis of rotation by the rotor.

The engine includes a stator disposed about the rotor. The stator has a stator assembly having an outer case. The outer case extends circumferentially about the working medium flow path to bound the flow path. The stator assembly has seal elements, such as a circumferentially extending seal member which is disposed radially about the rotor assembly. The seal member is formed of arcuate segments which permit the seal member to change diameter in response to operative conditions of the engine. The seal member is in close proximity to the tips of the rotor blades to form a seal that blocks the leakage of working medium gases from the flowpath.

The stator assembly also has arrays of stator vanes which extend radially inwardly across the working medium flow path. The stator vanes are commonly called vane clusters and have one or more airfoils or stator vanes. The stator vanes are disposed circumferentially about the axis A of the engine and are spaced apart by a small circumferential gap G.

The arrays of stator vanes are disposed upstream of the arrays of rotor blades in both the compression section and turbine section. The stator vanes guide the working medium gases as the gases are flowed along the flow path. Each has an airfoil which is designed to receive, interact with and discharge the working medium gases as the gases are flowed through the engine. The stator vanes have structure, such as an inner platform and an outer platform which bound the flow path for working medium gases.

The airfoils in the turbine section are bathed in hot working medium gases under operative conditions. Certain airfoils in the turbine section, such as stator vanes in the high pressure turbine, are cooled by flowing cooling air through the airfoil to avoid unacceptably high temperatures in the walls of the airfoil. Each stator vane has one or more large openings at its inner end and near its outer end near the outer case for receiving the cooling air.

A feather seal member, commonly called a feather seal, is typically provided in modem engines between each pair of circumferentially spaced stator vanes. The seal member bridges the gap G between the stator vanes to block the leakage of cooling air being supplied to the vane into the working medium flow path by flowing through the gap G. One example of such a coolable array of wall segments is shown in U.S. Pat. No. 4,767,260 issued to Clevenger et al., entitled "Stator Vane Platform Cooling Means". The feather seal slot typically extends into the vicinity of a rear rail for attaching the stator vane to adjacent structure. In some constructions, a radially extending feather seal is disposed in the rail. In another construction, a pair of feather seals are used to form a cooling air duct to flow cooling air between the feather seals to a downstream location as shown in U.S. Pat. No. 4,688,988 issued to Olsen and entitled "Coolable Stator Assembly for Gas Turbine Engine". The stator vane typically has many small cooling air holes which extend from the interior of the airfoil to the exterior of the airfoil. The cooling air holes cool the airfoil by convection and discharge cooling air at the gas path surface to provide film cooling to regions of the airfoil such as the leading edge region or the trailing edge region.

The wall segments of the outer air seal and the platforms of the stator vanes are in intimate contact with the hot working medium gases and receive heat from the gases in varying amounts over the surface of the platform. The outer air seal segments and the platforms of the turbine vanes are provided with cooling air from the openings which are in flow communication with internal cooling passages. One example is shown in U.S. Pat. No. 5,413,458 issued to Calderbank entitled "Turbine Vane With A Plafform Cavity Having A Double Feed for Cooling Fluid." In Calderbank, the turbine vane includes a platform cavity having a first inlet located on the pressure side and a second inlet located on the suction side of the stator vane. A cooling passage go extends rearwardly from both locations so that flow in the same direction toward the trailing edge of the platform. The flow provides convective cooling and film cooling by discharging cooling fluid through exit conduits such as film cooling holes which extend from the passage to flow surfaces on the platform.

An early example of a cooling scheme for a vane platform is shown in U.S. Pat. No. 3,628,880 issued to Smuland et al., entitled "Vane Assembly and Temperature Control Arrangement." U.S. Pat. No. 4,017,213 issued to Przirembel entitled "Turbomachinery Vane or Blade with Cooled Platforms" shows arrangements of small cooling conduits for providing a combination of impingement, convection and film cooling to the platform. The selective placing of the conduits includes a conduit which extends through the platform trailing edge for convectively cooling the trailing edge. U.S. Pat. No. 4,946,346 issued to Ito entitled "Gas Turbine Vane" shows a plurality of small conduits which extend through the trailing edge region and film cooling holes used in conjunction with the holes.

Serpentine passages have also been used for cooling outer air seals and for cooling turbine vanes. One example of an outer air seal construction having serpentine passages is shown in U.S. Pat. No. 5,538,393 issued Thompson et al. entitled "Turbine Shroud Segment With Serpentine Cooling Channels Having a Bend Passage." In Thompson, the outer air seal is provided with a plurality of serpentine channels which extend between the sides of the outer air seal segment. A serpentine channel was also used in the U.S. Pat. No. 4,353,679 issued to Hauser, entitled "Fluid-Cooled Element." In Hauser, the serpentine channel extends rearwardly and from side to side creating a flowpath that moves from the trailing edge forwardly in the platform to discharge film cooling air which then flows rearwardly over the platform.

The above notwithstanding, scientists and engineers working under the direction of Applicants Assignee have sought to develop a relatively simple cooling passage for the trailing edge region of a platform for a stator vane for providing cooling to the platforms of stator vanes.

SUMMARY

This invention is in part predicated on the recognition that the trailing edge region of the plafform for a stator vane near the suction side suffers particularly from heat transfer distress because of interactions between the hot working medium gases and the stator vanes which include end wall effects as the gases pass through the vanes. It is also predicated on the recognition that a vane platform having relatively a large cooling fluid passage, such as a serpentine passage for convectively cooling the platform and for supplying smaller exit conduits for film cooling, may flow the fluid to the rear of the platform with sufficient volume and velocity (momentum) that exhausted cooling fluid from one stator vane impinging on the suction side of the adjacent vane offsets the cooling requirements for the suction side of the adjacent stator vane and enables that vane in turn to similarly flow cooling fluid to the rear and exhaust cooling fluid against its adjacent vane.

According to the present invention, a method of cooling a rotary machine which has a pair of adjacent stator vane platforms each having a serpentine passage in the trailing edge region for cooling the platform includes flowing cooling fluid to the rearmost, last leg of the passage and laterally in the rearmost leg, then forming a stream of cooling fluid from that laterally flowing fluid which has at least thirty percent of the flow entering the passage and impinging the stream on the suction side of the adjacent vane.

In accordance with the present invention, the method includes forming the stream by passing the laterally flowing fluid under pressure through a conduit having a smaller cross-sectional area than the rearmost leg.

In accordance with one detailed embodiment of the present invention, the step of forming the stream includes flowing at least sixty percent (60%) of the cooling fluid which enters the serpentine passage in the stream of cooling fluid for impingement cooling the suction side of the adjacent vane.

In accordance with one detailed embodiment of the present invention, the method includes directing the stream of cooling fluid rearwardly such that the stream of cooling fluid provides film cooling to the adjacent downstream structure of the machine, such as an array of outer air seal segments or the platforms of an array of rotor blades.

In accordance with one detailed embodiment of the present invention, the step of impingement cooling the suction side of the adjacent vane includes discharging the cooling fluid through the side of the platform into a passage formed at least in part by an axially extending slot in one of said vanes.

According to the present invention, a method of cooling a pair of adjacent stator vane platforms includes the steps of: forming a cooling passage in the trailing edge region of one stator vane having a rearmost leg which has a portion extending laterally and toward the suction side of the trailing edge region of the adjacent vane; flowing the cooling fluid laterally; then, passing the fluid under pressure through a conduit having a smaller cross-sectional area which forms a stream of cooling fluid which is oriented in the lateral direction; and, discharging at least thirty percent of the flow of cooling fluid entering the rearmost leg in the lateral direction such that the stream provides impingement cooling to the trailing edge region on the suction side of the adjacent vane.

According to the present invention, a method of forming a cooling passage for cooling the suction side in the trailing edge region of the first stator vane of a pair of stator vanes vane includes extending the feather seal slot beyond the location of the feather seal member in at least one of the vanes, such as either the suction side of the first vane or the pressure side of the adjacent vane, to form a rearwardly extending passage bounded by the vanes and forming an exit conduit in the pressure side of the second vane that places the passage in flow communication with the interior of the adjacent vane to receive impingement cooling fluid from the adjacent vane; and, wherein the extension of the feather seal slot extends rearwardly to the trailing edge of the platform to provide film cooling to the adjacent downstream structure.

In accordance with another detailed embodiment of the present invention, the method includes disposing a feather seal member in the feather seal slot and extending the feather seal member to the extension of the feather seal slot for blocking the flow of cooling from the upstream end of the slot with the feather seal; and placing the extension of the feather seal slot in flow communication with a stream of cooling fluid passing through the exit conduit such that the stream of cooling fluid enters the extension of the feather seal slot on the stator vane at a location spaced rearwardly from the feather seal member.

A primary feature of the present invention is flowing from an adjacent stator vane at least thirty percent of the cooling fluid entering a serpentine passage of the adjacent vane and impinging the cooling fluid on the suction side of a stator vane. Another feature is laterally flowing the cooling fluid in the adjacent vane in the direction of discharge which extends laterally through an exit conduit. Still another feature is employing the extension of a feather seal slot as a cooling passage for ducting cooling fluid into contact with the suction side of the cooled vane and then rearwardly in sufficient volume to penetrate the rear boundary layer and provide film cooling to adjacent structure, such as an outer air seal or the platforms of an array of rotor blades. Still another feature is the method of making the cooling passage which includes extending the feather seal slot rearwardly and placing the extension of the feather seal slot in flow communication with a conduit to the rear passage of a serpentine passage.

A primary advantage of the present invention is the durability of a stator vane that results from cooling provided to the suction side of the stator vane in the trailing edge region of the platform by exhausted cooling air from the adjacent vane. Another advantage is the ease of forming the cooling passage by machining or grinding an extension of a feather seal slot in a platform and placing the feather seal slot in flow communication with a source of cooling fluid. Still another advantage is the cooling efficiency that results from discharging an amount of cooling fluid from an adjacent vane of a pair of vanes, impinging the cooling fluid at a location on the suction side of the other vane, and flowing the cooling fluid rearwardly to provide convective cooling to the suction side of that vane and to provide film cooling to downstream adjacent structure.

BEST MODE

Figure 1:
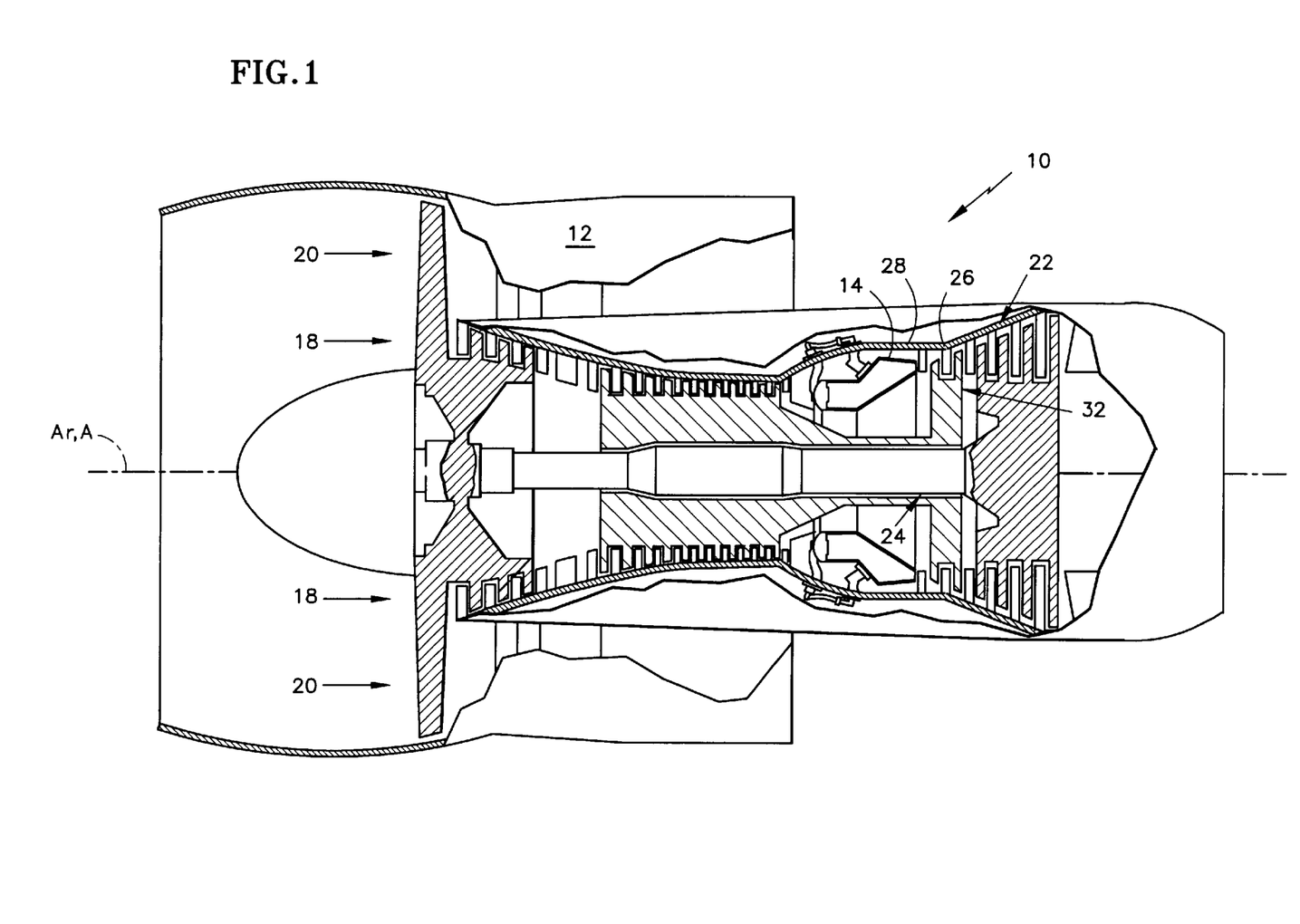
FIG. 1 is the side elevation view of a rotary machine such as a turbofan gas turbine engine having an axis of rotation Ar.

FIG. 1 is a schematic, side elevation view of a rotary machine 10, such as a turbofan gas turbine engine. The engine is disposed about an axis of symmetry A and has an axis of rotation Ar. The engine includes a compression section 12, a combustion section 14, and a turbine section 16. An annular, primary flowpath 18 for working medium gases extends axially through the sections of the engine. A by-pass flowpath 20 is outward of the primary flow path. The engine is partially broken away to show a stator 22 and a rotor 24 in the turbine section. The stator 22 includes a stator assembly 26 having an outer case 28 which extends circumferentially about the primary flowpath.

Figure 2:
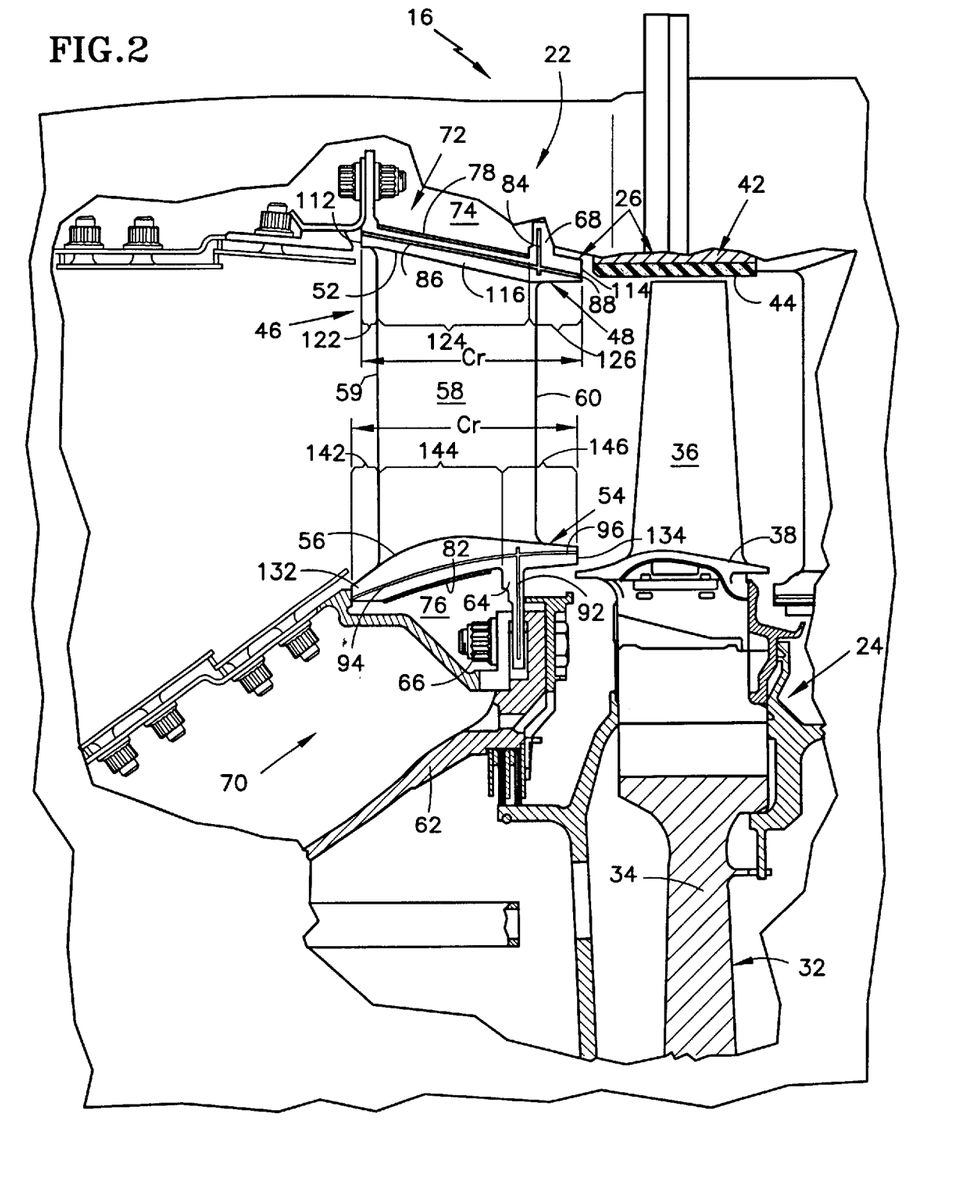
FIG. 2 is an enlarged side elevation view partly in cross section and partly in full showing a portion of the combustion section and turbine section of the gas turbine engine shown in FIG. 2 and shows an array of stator vanes in the turbine section.

FIG. 2 is an enlarged side elevation view of part of the turbine section 16 of FIG. 1. The rotor 24 includes a rotor assembly 32. The rotor assembly has a rotor disk 34 and an array or plurality of rotor blades (that is, an indefinite number of two or more) of rotor blades, as represented by the rotor blade 36. Each rotor blade has a platform 38. The platform inwardly bounds the working medium flowpath 18.

The rotor blades extend radially outwardly across the working medium flow path into close proximity with the stator 22.

The stator 22 further includes a seal member 42. The seal member is supported from the outer case. The seal member is disposed in close proximity to the outermost portion of the rotor blades 36 and outwardly bounds the working medium flowpath 18. The seal member is formed of a plurality of arcuate outer air seal segments, as represented by the arcuate segment 44. Each segment is spaced by a small circumferential gap (not shown) from the adjacent segment. The seal segments move inwardly and outwardly as the outer case 28 of the stator assembly 26 moves inwardly and outwardly in response to operative conditions of the engine. The segmented seal member 42 has very little hoop strength and provides decreased resistance to movement of the case 28 as compared to a seal member that is one piece and uninterrupted in the circumferential direction.

The stator assembly 26 extends circumferentially about the axes A and Ar. The stator assembly is commonly referred to as a case and vane assembly. The stator assembly includes an array of stator vane clusters, as represented by the cluster 46. The clusters are disposed circumferentially about the axis A Each cluster is commonly referred to as a stator vane. The stator vane has an outer diameter platform 48 having a gas path surface 52 and an inner diameter platform 54 having a gas path surface 56. The gas path surfaces on the platforms extend circumferentially and axially to bound the working medium flowpath 18 in the radial direction. One or more airfoils, as represented by the airfoil 58, extend radially between the platforms across the working medium flow path. Each airfoil has a leading edge 59 and a trailing edge 60.

In addition to the outer case 28, the stator assembly includes an inner case 62. The stator vane has an inner rail 64 for positioning the stator vane from the inner case. Each stator vane is positioned from the inner case with bolts 66 which extend through the inner rail. The stator vane has one or more outer rails, as represented by the rail 68, for positioning the stator vane from the outer case. In the embodiment shown, each stator vane is positioned from the outer case with bolts, pins, or lugs (not shown) which engage the outer rail.

The stator 22 has an inner diameter region 70 and an outer diameter region 72. The stator has a first annular plenum 74 for cooling fluid, such as cooling air from the compression section 12, which extends circumferentially about the outer diameter region 72. A second annular plenum 76 for cooling air extends circumferentially about the inner diameter region 70 of the stator. Each stator vane 46 has at least one opening in each end which places the interior of the vane in flow communication with the plenum for supplying cooling air to the vane. These openings are represented by the opening 78 adjacent the outer platform and the opening 82 adjacent the inner platform.

Figure 3:
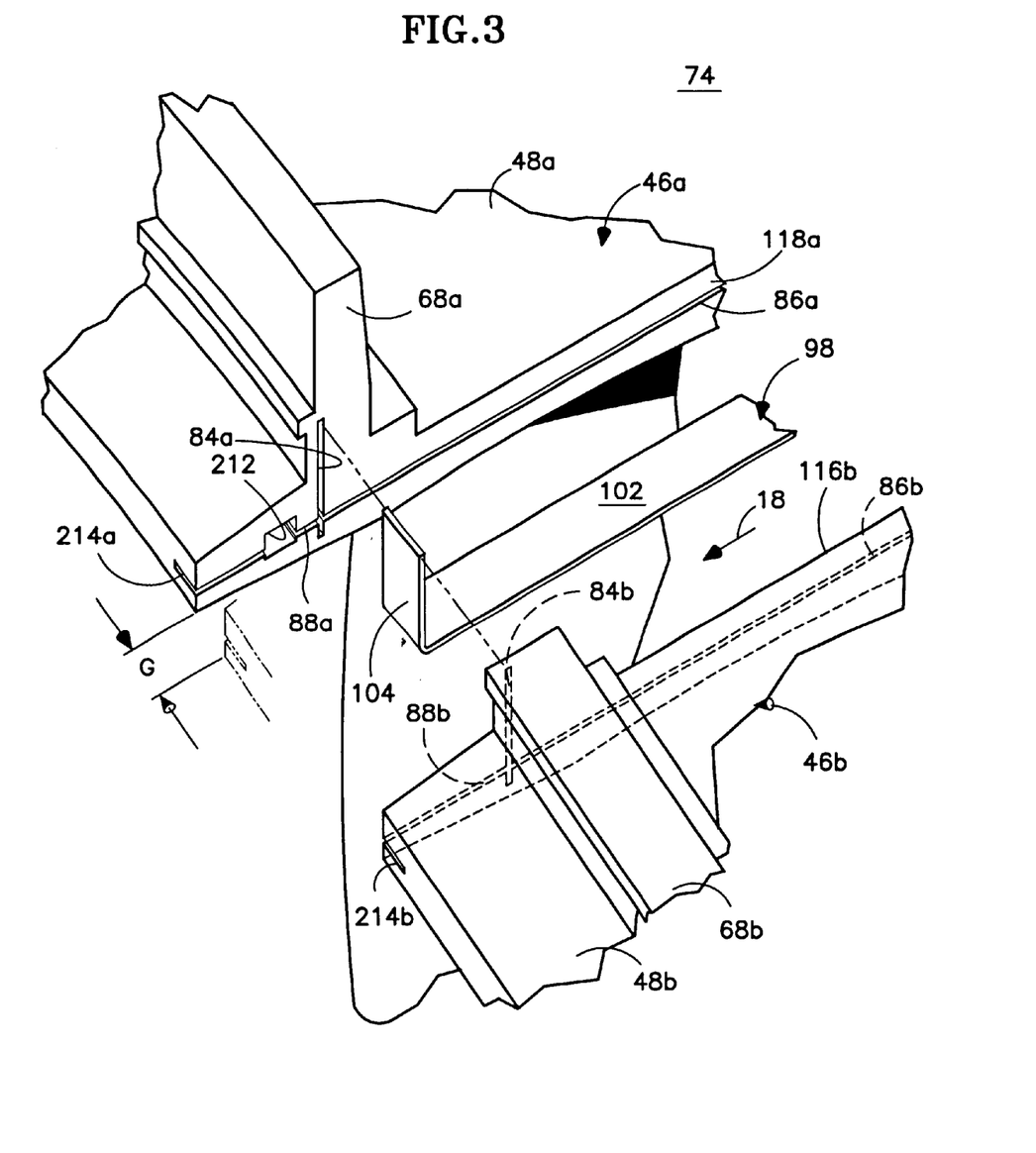
FIG. 3 is a perspective view of the outer platform shown in FIG. 2 showing the relationship of a feather seal member to slots formed in the pressure side and the suction side of adjacent stator vanes.

FIG. 3 is a perspective view of part of a pair of adjacent stator vanes 46a, 46b showing part of the outer platforms 48a, 48b with the installed position of platform 48b shown by the broken lines. As shown in FIG. 2 and FIG. 3, each platform of the stator vane 46 further has slots. The slots are represented by the feather seal slots 84, 86 and the extension slot 88 at the outer platform, and by the feather seal slots 92, 94 and the extension slot 96 at the inner platform 54. Pairs of feather seal slots in adjacent vanes face circumferentially for receiving an associated feather seal member, as represented by the feather seal member 98. Each feather seal member 98 extends between a pair of adjacent stator vanes 46a, 46b in the installed condition. The feather seal member has an axial leg 102 and a radial leg 104. The feather seal member slidably engages the associated stator vanes to provide sealing in the gap G between the adjacent vanes. The stator vanes and the feather seal members form, in effect, a circumferentially continuous barrier between the working medium flowpath 18 and the plenum 74 with the feather seal members closing the gap G and sliding on the vanes as the stator assembly moves inwardly and outwardly in response to operative conditions of the engine.

Figure 4:
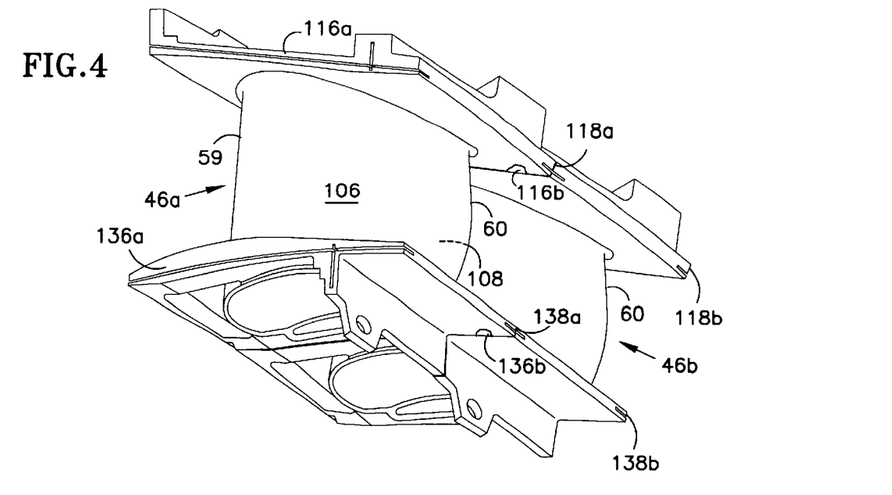
FIG. 4 is a perspective view of a pair of stator vanes of the type shown in FIG. 2.

FIG. 4 is a perspective view from below of the pair of adjacent stator vanes 46a, 46b. The airfoil 58 has flow directing surfaces which extend between the leading edge 59 and the trailing edge 60 such as a suction surface 106 and a pressure surface 108.

Figure 5:
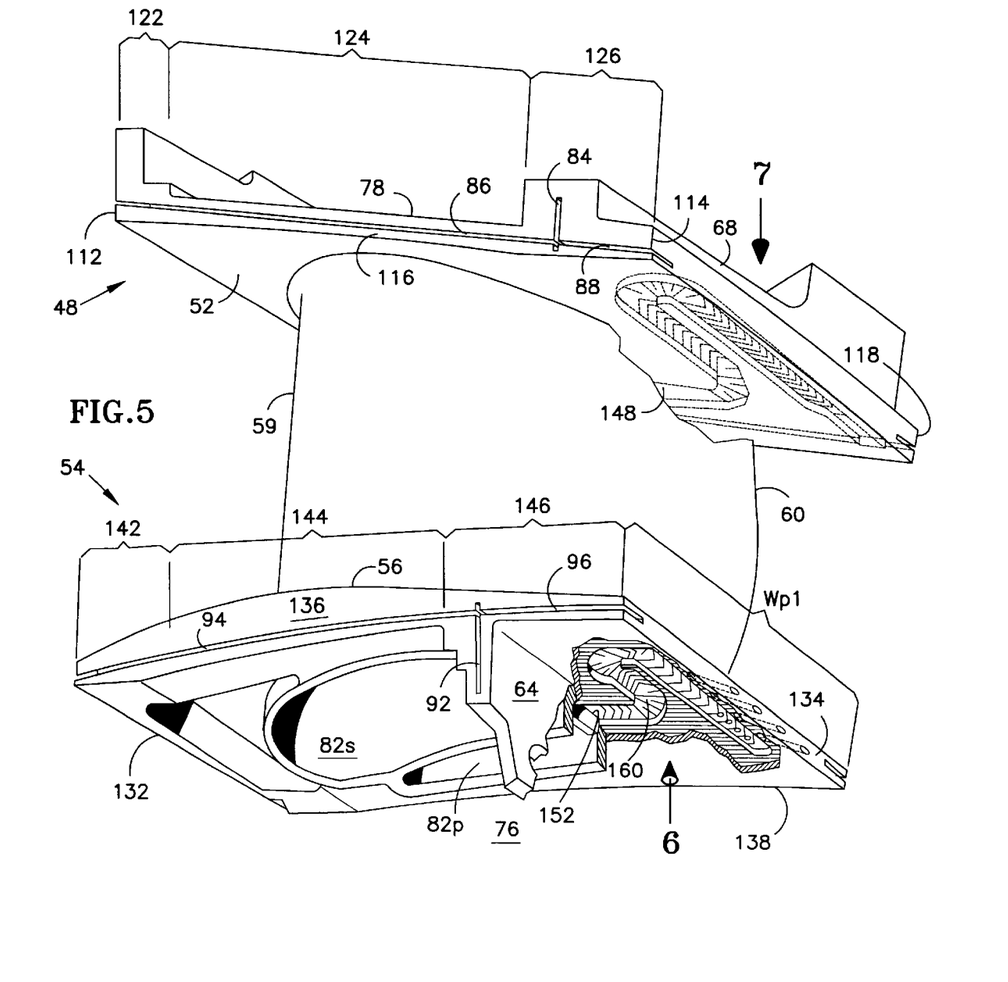
FIG. 5 is a perspective view partially in cross-section and partially broken away to show cooling passages disposed in the trailing edge region of the stator vanes shown in FIG. 4.

As shown in FIG. 2, FIG. 4 and FIG. 5, the outer platform 48 has a leading edge 112. A trailing edge 114 is spaced axially from the leading edge by a distance Cr as measured perpendicular to the trailing edge. The leading edge and the trailing edge of the platform each lie in a radial plane which is perpendicular to the axis A of the engine in the installed condition. The platform has a suction side 116 and a pressure side 118. The suction side of one platform faces the pressure side of the adjacent platform. Each side extends between the leading edge and the trailing edge. The pressure side is spaced laterally from the suction side by a width Wpl. The width Wpl is measured along a line parallel to the trailing edge of the platform.

The outer platform 48 has a leading edge region 122 forward of the airfoil 58. The platform has a mid-hord region 124 from which the airfoil extends. The platform has a trailing edge region 126 aft of the midchord region. The trailing edge region of the platform extends rearwardly from the rearmost attachment rail 68 to the trailing edge.

The inner platform 54 has a leading edge 132. A trailing edge 134 is spaced axially from the leading edge by a distance Cr as measured perpendicular to the trailing edge. The leading edge and the trailing edge of the platform each lie in a radial plane which is perpendicular to the axis A of the engine in the installed condition. The platform has a suction side 136 and a pressure side 138. The suction side of one platform faces the pressure side of the adjacent platform. Each side extends between the leading edge and the trailing edge. The pressure side is spaced laterally from the suction side by a width Wpl. The width Wpl is measured along a line parallel to the trailing edge of the platform. The width of the outer diameter platform Wpl and the width of the inner diameter platform Wpl are not equal.

The inner platform 54 has a leading edge region 142 forward of the airfoil 58. The platform has a mid-chord region 144 from which the airfoil extends. The platform has a trailing edge region 146 aft of the midchord region. The trailing edge region of the platform extends rearwardly from the rearmost attachment rail 64 to the trailing edge.

FIG. 5 is an enlarged perspective view of the stator vane 46 shown in Fig.4 with portions of the vane broken away in the trailing edge regions 126, 146. The outer platform 48 has the outer opening 78 which is in flow communication with the outer plenum 74 for cooling air. The inner platform 54 has a suction side opening 82s and a pressure side opening 82p. Each of the openings 82s, 82p is in flow communication with the inner cooling air plenum 76. An internal opening 148 on the interior of the outer platform 48 and an internal opening 152 on the interior of the inner platform 54 in the trailing edge region 126, 146 of each platform places the respective trailing edge region in flow communication with the associated plenum for cooling air.

Figure 6A:
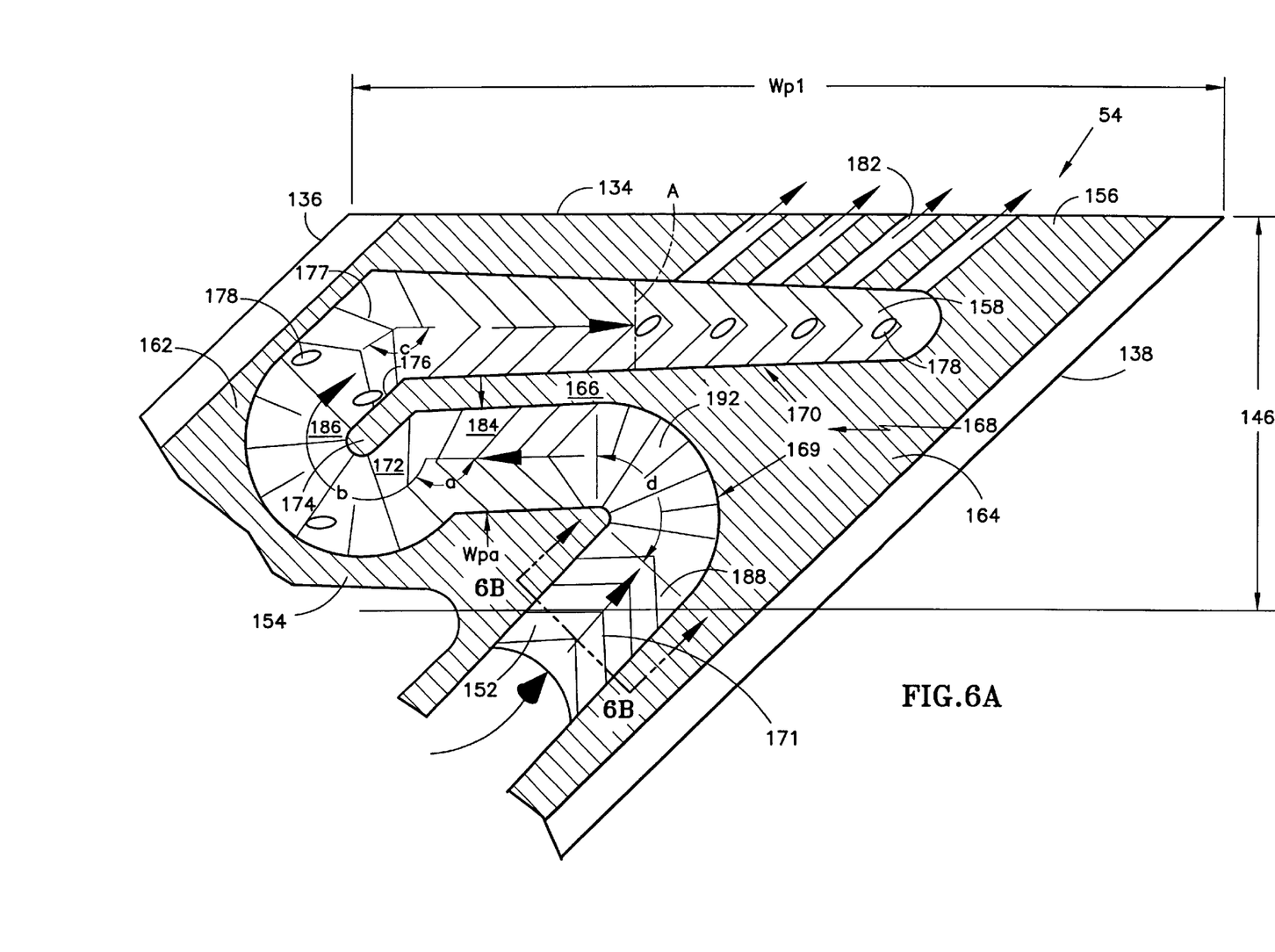
FIG. 6A is view from below and partially broken away of the trailing edge region of the stator vane shown in FIG. 5.

FIG. 6A is a view from below of the inner platform 54 of the stator vane 46 taken in the direction of the arrow 6 of FIG. 5. The platform is broken away to show the trailing edge region 146 of the platform. The platform has a first wall 154 in the trailing edge region which extends laterally between the sides. The first wall has the opening 152 which adapts the platform to be in flow communication with the inner plenum 76. The platform has a second wall 156 adjacent the trailing edge 134 which extends laterally between the sides 136, 138 and is spaced axially from the first wall leaving a cavity 158 for cooling fluid therebetween. The cavity is bounded in the spanwise direction by a pair of spanwisely facing walls, one wall 160 of which is shown in FIG. 5. The wall is spaced spanwisely from the gas path surface 56. The platform has a suction side wall 162. The suction side wall extends from the first wall 154 to the second wall 156 to laterally bound the cavity 158 on the suction side of the platform. A portion of the suction side wall extends substantially parallel to the suction side 136 of the vane platform. A pressure side wall 164 extends from the first wall to the second wall to laterally bound the cavity on the pressure side.

The pressure side wall 164 has a single rib 166 which extends laterally from the pressure side wall toward the suction side wall 136. The rib is spaced axially from the first wall 154 and the second wall 156 to form a serpentine passage 168 in the cavity 158 for cooling fluid. The passage has a first (forward) pass 169 and a rear pass 170 which extend in generally lateral directions across the platform. As shown in FIG. 5, a plurality of trip strips 171 are disposed in the passage on the wall 160 under the gas path surface 56. The trip strips are straight or chevron shaped. The passage has a length L as measured along the centerline of the passage which is less than or equal to one and one fourth the width of the platform Wpl (L≦1.25 Wpl). The passage has a width Wpa as measured perpendicular to the centerline of the passage. The width is relatively wide and in a range of ten percent to fifteen percent of the width Wpl of the platform (0.1Wpl≦Wpa≦0.15Wpl).

The rib 166 is spaced axially from the first wall 154 and laterally from the suction side wall 162 leaving a first turn region 172 therebetween. The rib has a projection 174 which is angled toward the first wall and toward the direction of the on-coming flow of cooling air under operative conditions. The angled projection causes the passage to turn through an acute angle a. The first turn region thereafter has an additional turn through an angle b of one hundred and eighty degrees.

The projection 174 has a wall 176 parallel to the suction side wall 162 which extends substantially parallel to the suction side 136 of the airfoil and parallel to the suction side wall. The two walls 162, 176 direct flow in the passage 168 against the second wall 156 adjacent the trailing edge 134 at a location adjacent the suction side of the platform and the flow passes through a second turn region 177 having an acute angle c.

As shown in FIG. 6A, a plurality of exit conduits 178, 182 are adapted to flow cooling fluid from the passage to the exterior of the platform under operative conditions. The plurality of exit conduits includes at least one film cooling conduit, as represented by the film cooling conduits 178, which are in flow communication with the gas path surface 56 of the platform. The plurality of exit conduits includes at least one trailing edge conduit, as represented by the trailing edge conduits 182, which extends between the rear pass 170 of the passage and the trailing edge 134 of the stator vane.

In the embodiment shown, the rearmost portion of the passage (rear pass or rear leg 170) is in flow communication with the platform surface with four film cooling conduits 178 having a total cross sectional area Arfc and an associated flow characteristic Crfc under operative conditions. The total cross sectional area is a summation of the areas of the four film cooling conduits. In addition, a portion of the passage upstream of the rearmost leg is in flow communication of the surface of the platform through three film cooling conduits 178 located in the first turn region 172 having a total cross sectional flow area Apfc and an associated flow characteristic Cpfc under operative conditions. Accordingly, only seven film cooling conduits extend from the interior of the platform to the exterior of the inner plafform with the balance of the flow exiting through other exit conduits in the trailing edge which are not in flow communication with the gas path surface of the platform. The other exit conduits are the four trailing edge conduits 182 having a total cross sectional flow area Arte and an associated flow characteristic Crte for discharging cooling fluid entering the rear leg at the trailing edge. The areas are selected for the embodiment shown in FIG. 6A so that total cross sectional area Arte is equal to about seven percent (7%) of the cross sectional flow area Arpa of the last leg at a location A adjacent the first of the exit conduits (either exit conduit 178 or 182 of the last leg). The area of the film cooling holes Arfc extending to the gas path surface from the rear leg is about six percent (6%) of the cross sectional flow area Arpa of the rear leg. The cross sectional flow area Apfc of the film cooling holes in the first turn region is about five percent (5%) of the cross sectional flow area Arpa of the rear leg.

The rib and the walls cooperate to form a plurality of legs disposed in serial fashion with respect to each other. The legs of the passage receive the flow as the flow moves through the passage and yet the flow passes through these plurality of legs while only undergoing two passes through the trailing edge region of the platform. The legs include a first leg 184, a second leg 186, the rearmost or rear leg 170, and a fourth leg 188. The rear leg is coextensive with the rear pass.

The first leg is disposed at an angle α (α=a+b) to the downstream adjacent second leg. The rear leg is the rearmost leg of the passage and is disposed at an angle c to the upstream adjacent leg. In this particular embodiment, the upstream adjacent leg is the second leg 186. The rear leg extends laterally across over half the width Wpl of the platform as measured parallel to the trailing edge 134.

Figure 6B:
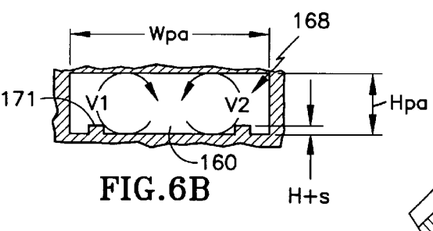
FIG. 6B is a cross-sectional view along the lines 6B—6B of FIG. 6A with portions of the vane broken away.

The fourth leg places the opening 152 which extends through the first wall 154 in flow communication with the first leg. Accordingly, the fourth leg forms an entrance section of the passage. FIG. 6B is a cross sectional view of the passage 168 taken through the fourth leg along the line 6B—6B. The passage has a width Wpa of about two hundred thousandths of an inch (0.200 inches) and a height Hpa of about one hundred thousandths of an inch (0.100 inches). The passage generally has an aspect ratio Hpa/Wpa which is about one half.

The fourth leg is adjacent the pressure side wall of the platform and extends substantially parallel to the pressure side 138 of the platform. A third turn region 192 is disposed between the fourth leg and the first leg. The passage turns through an angle d which is greater than ninety degrees (90°) in the third turn region. After the third turn region, the passage extends along the first, straight leg. As mentioned above, the first turn region sequentially connects the first leg to the second leg. The first turn region causes the passage to turn through angles whose summation is greater than one hundred and eighty degrees (180°). The first turn region is followed by the straight second leg of the passage and then by the second turn region between the second leg and the rear leg. The second turn region causes the passage turn through an acute angle which is greater than forty-five degrees (45°).

Figure 6C:
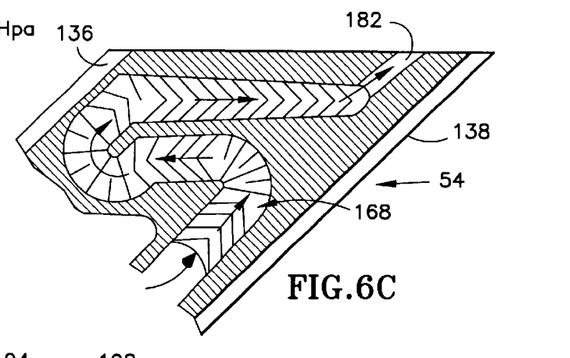
FIG. 6C is an alternate embodiment of the embodiment shown in FIG. 6A.

FIG. 6C is an alternate embodiment of the inner platformn 54 shown in FIG. 6A having a single trailing edge conduit 182 in flow communication with the trailing edge. In other respects, it is the same as the embodiment shown in FIG. 6A. The cooling air exits in a jet or stream under pressure, closely adjacent to the pressure side 138 of the airfoil and closely adjacent to the suction side of the adjacent airfoil.

Figure 6D:
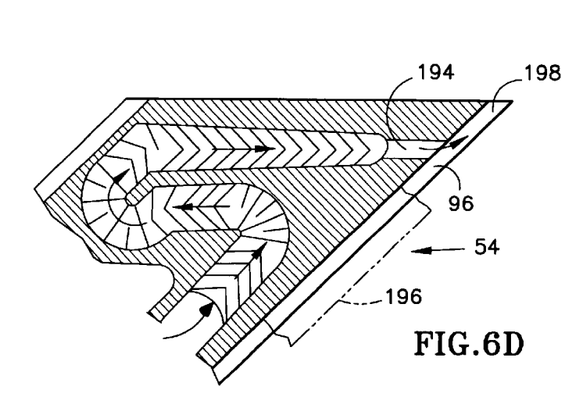
FIG. 6D is an alternate embodiment of the embodiment shown in FIG. 6A.

FIG. 6D is an alternate embodiment of the inner platform 54 shown in FIG. 6A. The platform has a single trailing edge conduit 194 which extends laterally to the extension 96 of the feather seal slot. No feather seal is disposed in the extension of the feather seal slot. As a result, the feather seal 196 in cooperation with the adjacent extension of the feather seal slot 96 (such as 96a and 96b) forms a trailing edge conduit 198 in both platforms which extends rearwardly to the trailing edge 134a and 134b of both adjacent vanes 46a and 46b.

Figure 7:
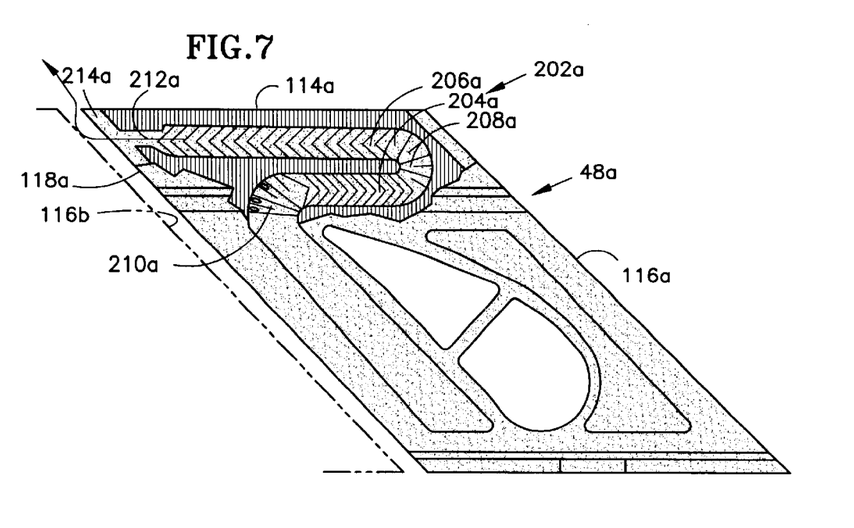
FIG. 7 is a view from above as shown by direction arrow 7 shown in FIG. 5 of the trailing edge region of the outer platform of the stator vane.

FIG. 7 is a cross-sectional view from above of the outer platform 48 in the trailing edge region 126 and is taken in the direction shown by the arrow 7 of FIG. 5. As shown in FIG. 7, the outer platform has a passage 202 in the trailing edge region which makes two passes, 204, 206 passing through a first turn region and a second turn region. The passage rapidly tapers laterally in the rear leg and terminates at a lateral conduit 212 which extends laterally as did the trailing edge conduit of the embodiment shown in FIG. 6D. The extension 88 of the feather seal slot forms a trailing edge conduit 214 which is similar to the trailing edge conduit 198 of FIG. 6D.

FIG. 3 is the perspective view discussed above of portions of the two adjacent stator vanes 46a, 46b shown in FIG. 4. FIG. 3 shows the relationship of the feather seal slots 84, 86 and the extension 88 of the feather seal slot to the laterally extending conduit 212 shown in FIG. 7. As shown FIG. 7 and FIG. 3, the conduit extends on the pressure side 118 of the vane 46a. The conduit is in flow communication with the extensions 88a, 88b of the feather seal slot. The feather seal member 98 seals off the upstream end of the extension. The feather seal member and the extension forms the trailing edge conduit 214a, b which extends to the trailing edge 114 for ducting cooling fluid rearwardly after the cooling air is flowed out of the rear leg or pass 206 of the outer platform 48.

During operation of the gas turbine engine 10 shown FIG. 1, working medium gases are flowed along the primary flow path 18 of the engine and through the combustion section 14. The working medium gases contain oxygen which is burned with fuel to raise the temperature of the gases. These hot gases are expanded through the turbine section 16 passing through the array of stator vanes 46 immediately downstream of the combustion section 14. Boundary layers of working medium gases form on the gas path surfaces 52, 56 of the outer platform 48 and the inner platform 54.

Cooling air from the compression section 12 is flowed to the annular inner plenum 76 adjacent the inner platform 54. The cooling air is flowed in two passes 169, 170 through the legs 188, 184, 186, and 170 of the passage in the trailing edge region 146 of the platform. The cooling air convectively cools the airfoil and to some extent is used for film cooling. The flow characteristics of the passage Cpa, of the film cooling conduits Cpfc, Crfc and of the trailing edge conduits Crte are established to establish baseline cooling air flows for the durability condition of the stator vane. In this embodiment, the flow of cooling air for the durability condition of the vane follows closely the flow required at the Sea Level Take Off condition of the engine (SLTO). At this condition, at least half the cooling air entering the pressure side opening of the vane is flowed through the passage. In this particular embodiment, about sixty percent of the cooling air enters the passage.

As the cooling air is flowed through the passage, over sixty percent of the cooling air entering the passage is discharged through the rear leg of the passage adjacent the trailing edge. In the embodiment shown, about three fourths (¾) of the air is so discharged.

Only about one fourth (¼) of the cooling air entering the passage 168 is discharged in the first turn region 172. The cooling air is discharged through the three film cooling conduits 178 on an upstream portion of the platform. The discharge in this location is more intrusive into the boundary layer which forms on the adjacent gas path surface 56 than discharge from film cooling conduits adjacent the trailing edge. It is desirable to avoid discharging cooling air into this part of the boundary layer because of the adverse effect such intrusion has on the aerodynamic efficiency of the stator vanes. The four film cooling conduits 178 extending outwardly from the trailing edge pass (rear leg 170) have less of an effect on the aerodynamic efficiency because their intrusion into the flow path only disturbs a small portion of the boundary layer on the platform in a less critical location at the rear of the stator vane.

Accordingly, as the flow of cooling air passes through the passage, approximately seventy percent (70%) to eighty percent (80%) of the flow is discharged through conduits 178, 182 in the rear leg 170 of the passage. Flow characteristics of the trailing edge conduits and the film cooling conduits Crte and Crfc in the rear leg are established so that about half (fifty five percent (55%)) of the flow entering the rear leg is discharged through the trailing edge conduits 182 and about half (forty five percent (45%)) of the flow is discharged through the film cooling conduits 178. The expected range of flow for the trailing edge conduits is about forty to sixty percent of flow entering the rear leg with the balance being discharged through the film cooling conduit. In addition, the flow characteristic of the film cooling holes upstream of the rear leg are selected such that only about twenty five percent (25%) (that is, twenty to thirty percent) of the flow entering the passage is discharged through the three film cooling conduits 178 in the first turn region 172. This combination of film cooling conduits and trailing edge conduits provides a smaller level of film and convective cooling flow through the conduits to the suction side of the stator vane than the level of flow film and convective cooling to the trailing edge in the in the rear leg 170 of the vane.

The cooling air discharged through the trailing edge conduits is discharged rearwardly in a location which is closer to the pressure side 138 of the inner platform 54. The flow has a component of velocity in the direction of rotation of the rotor blades 36 of the adjacent rotor assembly 32. The flow characteristic Crte of the trailing edge conduits ensures that the cooling air exits in jets or streams under pressure that punch through the boundary layer that forms at the trailing edge 114 of the platform. The jets send a film of cooling air that extends over the platforms 38 of the downstream rotor blades. This provides film cooling to the rotor blades by shielding a portion of the platform of the rotor blades from the hot working medium gases. Accordingly, by discharging about forty percent of the flow of cooling air through the trailing edge conduits, less than thirty percent (30%) of the air entering the passage 168 is discharged in the first turn region 172 to the gas path surface of the platform with about one-third (⅓) being discharged through film cooling holes in the rear leg. As mentioned, this reduces the intrusion of the film cooling air into the boundary layer formed on the gas path surface with a beneficial effect on the aerodynamic efficiency of the stage of stator vanes.

A particular advantage of the present invention is the convective heat transfer which takes place internally between the suction side of the platform because of the sequence of turns that the cooling air goes through as it flows through the first turn region 172. The aerodynamic effects of the turn increase convective heat transfer by causing entrance effects in the flow. The increased convective heat transfer in this section of the platform bolsters the effect on platform temperature that the film cooling provides through the three film cooling conduits. These entrance effects continue and are intensified by the projection 174 and the remainder of the turn. The summation of the angle of the turn is greater than one hundred and eighty (180) degrees and includes the angle a through which the flow moves as the flow is directed toward the projection 174 on the rib 166. The disruption of flow by the projection greatly increases turbulence in the flow increasing the convective heat transfer coefficient and providing a level of convective heat transfer on the suction side of the airfoil which enables accepting the level of film cooling provided by the three film cooling conduits in this portion of the platform. The flow then passes through the second leg 186 which reorients the flow and directs the flow toward the acute angle turn at the second (trailing edge) wall 156. This urges the flow to again move toward the suction side in the trailing edge and into the corner to transfer heat from the platform to the cooling fluid in this region of the platform. Thereafter, the flow proceeds laterally through the rear leg.

The rear leg has chevron shaped trip strips 171 which extend on the gas path wall 160 across the width of the passage 168. The trip strps are angled in the downstream direction away from the oncoming flow to promote formation of counterrotating vortices V1, V2 that scrub the gas path wall of the platform and increase the convective heat transfer coefficient. The passage is tapered in the lateral direction to increase the velocity of the flow and the Reynolds number (ratio of momentum forces to viscous forces in the fluid) as the flow moves along the rear leg to increase the convective heat transfer coefficient. Flow is then discharged through the film cooling conduits 178 and the trailing edge conduits 182 as discussed above.

A particular advantage of the present invention is the use of just two passes 169, 170 to provide cooling in the trailing edge region 126 of the stator vane 46. The two passes, downstream of the rail 64, provide a temperature gradient between the cooling air and the walls of the platform which is greater in the first turn region than the temperature gradient in a multipass configuration having more than two passes through the trailing edge region. The length of the passage 168 (and consequent exposure of the cooling air to heat transfer area) prior to reaching the first turn region is one indicator of the effect of the number of passes on the temperature gradient between the wall and the cooling air at the first turn region. One non-dimensional measure of the length of the passage for heat transfer effects compares the length of the serpentine passage in the trailing edge region compared to the width of the trailing edge region. The length of the passage 168 is less than one and half times the width Wpl of the platform and, in the construction shown, is less than one and one quarter times the width of the platform. In addition, the height to width aspect ratio of the passage is relatively low. The passage has a height to width ratio of the passage which is about one half in the untapered portion.

The present invention has created a relatively short, relatively wide passage having large turns and projecting structure in critical regions of the platform to reduce the amount of cooling air being flowed into the gas path surface of the airfoil with a concomitant benefit on the aerodynamic efficiency of the stator vane. The size of the passage also facilitates in casting the passage as compared to constructions that have many narrower passes.

As shown in FIG. 7, cooling air is discharged from the outer platform of the stator vane 48a laterally from the conduit 212 against the suction side 116b of the adjacent stator vane 48b and then rearwardly to provide film cooling to the downstream array of rotor blades. A particular advantage of this configuration is that cooling air from the pressure side of one stator vane is used for impingement cooling of the suction side of the adjacent stator vane which again reduces the need to provide film cooling holes to the gas path surface of the adjacent stator vane at an upstream location. The method of cooling the pair of stator vanes thus includes the steps of forming a platform 48 on a first stator vane 46a and a platform 48b on the adjacent (second) stator vane 46b which each have feather seal slots 86a, 86b and an extension 88a, 88b of the feather seal slots. The step of forming the feather seal slot follows with an extension of the slot to the trailing edge of one or both of the stator vanes. The slot may be formed by a machining operation such as electrodischarge machining (EDM) or grinding. It is a simple matter to continue the slot rather than specially forming another slot in the side of the platform.

Accordingly, a particular advantage of this embodiment of the method of cooling the stator vane and the downstream rotor blade is the simplicity which the trailing edge conduit is constructed by merely forming the extension the formation of the feather seal slot The feather seal slot, instead of terminating shortly after the intersection with the radial feather seal slot, is merely extended during the machining process.

The next step in the embodiment shown is forming a radially (spanwisely) extending feather seal slot 84 in the rail extending from the platform. The radial feather seal slot intersects the first feather seal slot. A feather seal member 98 is disposed in the slot which has a first leg 102 disposed in the first feather seal slot 86a, 86b which does not extend into the trailing edge extension 88a, 88b of the airfoil. The feather seal member 98 has the second leg 104 which is integral with the first leg which extends radially. The feather seal member is thus disposed in the second feather seal slot trapping the feather seal member in the axial direction.

The method includes forming an exit conduit 212a on the interior of the platform which includes the rear leg 206 extending across the platform adjacent the trailing edge for ducting cooling air from the first vane under operative conditions. The lateral flow in the lateral rear leg 206 aligns the flow with the exit conduit 212a and the flow passing through the conduit. The method includes directing the conduit so that flow under operative conditions in the exit conduit from a stream that impinges on the suction side 116b of the platform of the second vane. The term impinge means that the flow strikes or comes in close proximity with the side to provide impingement cooling to the side.

Figure 7A:
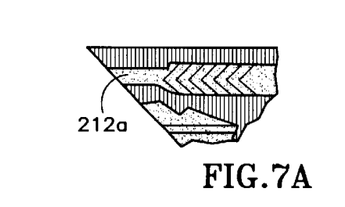
FIG. 7A is an alternate embodiment of the embodiment shown in FIG. 7.

The method includes flowing the cooling air rearwardly in the trailing edge conduit 214 formed by the slots to form a jet of cooling air in the extension of the feather seal slot. The jet or stream of cooling air is directed at adjacent downstream structure to provide film cooing to the downstream structure. In an alternate embodiment, the method of forming a cooling passage using an extension of the feather seal slot would include blocking the end of the feather slot at the extension to trap rearward movement of the feather seal member in the feather seal slot or machining an equivalent of the extension from the trailing edge of each platform which does not reach the feather seal slot. As shown in FIG. 7A, the extension of the slot might be formed in only one stator vane platform, such as the platform 48b with no extension in the platform 48a.

A particular advantage of the present invention is the heat transfer which results from impinging the cooling air from passage 212a against the facing suction side 116b of the adjacent airfoil. The effect is further intensified on the suction side of platform 48b by the platform structure bounding the extension 88b of the feather seal slot. The structure bounding the slot extends laterally from the thicker portion of the platform, acting to form a low aspect ratio channel which increases the heat transfer coefficient by decreasing the hydraulic diameter.

Under some operative conditions, the gap G will open slightly allowing cooling air to discharge outwardly through the gap G. This provides film cooling to the suction side and pressure side of the platform. A particularly severe operating condition of the engine is the sea level takeoff (SLTO) operating condition. At this condition, the engine accelerates rapidly from the idle thrust condition to a very high thrust condition for sea level takeoff. The gap G between adjacent stator vanes at idle is relatively small in comparison to the gap G which occurs during the cruise condition. The gap G at cruise results from the outer case moving outwardly in response to heat transfer to the outer case from the working medium flowpath 18 and moving the array of stator vanes to a larger diameter. The sudden increase in the volume of hot, working medium gases at sea level takeoff passing from the combustion chamber to the turbine section causes a rapid increase in the temperature of the surfaces of the rotor blades immediately adjacent the flowpath. At the same time, the rotor blades experience transient forces as the rotational speed of the rotor assembly rapidly increases. Only a small amount of cooling air is lost through the feather seal slots at that operating condition. As a result, the air is more confined to the extension of the feather seal slot than at cruise. The cooling air is directed rearwardly to form circumferentially spaced jets of cooling air. A film of cooling air develops as the rotor blades pass by the jets of cooling air and decreases heat transfer to the leading edge of the platform of the downstream rotor blades. In the steady state condition, the gap G opens more than at sea level takeoff and part of the cooling air then flows outwardly to form a film of cooling air to protect the surfaces of the stator vane and the remainder film cools the rotor blades.

Although the invention has been shown and described with respect to detailed embodiment thereof, it should be understood by those skilled in the art that various changes in form and detail thereof may be made without departing from the spirit and the scope of the claimed invention.

What is claimed is:

1. A method for cooling a turbine section of a rotary machine having a working medium flowpath, the turbine section including an array of coolable stator vanes, each stator vane having an airfoil extending radially outwardly into the working medium flowpath, the airfoil having a leading edge, a trailing edge and flow directing surfaces which extend between the edges and which include a suction surface and a pressure surface, the stator vane having a platform which bounds the working medium flowpath which has a suction side, a pressure side, a leading edge region and a trailing edge region, the trailing edge region having a serpentine passage in the trailing edge region for cooling fluid, comprising:

flowing cooling fluid to the rearmost, last leg of the passage;

flowing cooling fluid entering the passage along a flowpath which extends laterally in the rearmost leg; then,     forming a stream of cooling fluid which is oriented in the lateral direction and which has at least thirty percent of the flow entering the passage; and,     discharging said stream of cooling fluid from the interior of the platform in the lateral direction;

impinging the stream on the suction side of the platform of the adjacent vane in the trailing edge region;

wherein the cooling fluid provides impingement cooling to the suction side of the platform of the one vane and provides convective cooling in the serpentine passage to the trailing edge region of the adjacent vane.

2. The method for cooling the turbine section of a rotary machine of claim 1 wherein the step of flowing cooling fluid entering the passage along a flowpath which extends laterally in the rearmost leg includes increasing the velocity of the laterally flowing cooling fluid by tapering the passage in the lateral direction to decrease the flow area of the rearmost leg of the passage.

3. The method for cooling the turbine section of a rotary machine of claim 1 wherein the step of forming a stream includes the step of passing the laterally flowing fluid under pressure through an exit conduit having a smaller cross-sectional area than the rearmost leg adjacent the exit conduit.

4. The method for cooling the turbine section of a rotary machine of claim 3 wherein the method which includes the step of passing the laterally flowing fluid under pressure through the exit conduit includes forming a conduit having a cross-sectional area which lies in a range of six to fifteen percent of the cross-sectional area of said tapered rear leg adjacent the exit conduit.

5. The method for cooling the turbine section of a rotary machine of claim 1 wherein the rotary machine further includes an adjacent downstream structure and wherein the method includes the step of directing the stream of cooling fluid rearwardly such that the stream of cooling fluid provides convective cooling to the suction side of the platform of said one stator vane and film cooling to the adjacent downstream structure of the machine.

6. The method for cooling the turbine section of a rotary machine of claim 5 wherein said downstream adjacent structure is an outer air seal segment.

7. The method for cooling the turbine section of a rotary machine of claim 5 wherein said downstream adjacent structure is a platform of a rotor blade.

8. The method for cooling the turbine section of a rotary machine of claim 5 wherein the step of impinging the stream of cooling fluid on the suction side of the platform of said one vane includes the step of discharging the cooling fluid through the side of the platform and forming an axially extending slot in said one vane to form at least part of a passage for receiving the cooling air.

9. The method for cooling the turbine section of a rotary machine of claim 8 wherein the slot is an extension of a feather seal slot in said vane.

10. The method for cooling the turbine section of a rotary machine of claim 1 wherein the step of forming the stream includes flowing at least sixty percent (60%) of the cooling fluid which enters the serpentine passage in the stream of cooling fluid for impingement cooling the suction side of the platform of said one vane.

11. The method for cooling the turbine section of a rotary machine of claim 10 wherein the step of forming the stream includes flowing all of the cooling fluid which enters the rear leg of the serpentine passage in the stream of cooling fluid for impingement cooling the suction side of said one vane.

12. A method for forming a cooling passage in a turbine section of a rotary machine having a working medium flowpath, the turbine section including an array of coolable stator vanes, each stator vane having an airfoil extending radially outwardly into the working medium flowpath, the airfoil having a leading edge, a trailing edge and flow directing surfaces which extend between the edges and which include a suction surface and a pressure surface, the stator vane having a platform which bounds the working medium flowpath which has a suction side, a pressure side, a leading edge region and a trailing edge region, comprising:

forming a platform on a first stator vane and a second stator vane which includes     forming a feather seal slot which extends rearwardly in one of said sides of one of said stator vanes and forming an extension of the feather seal slot which continues to the trailing edge of the platform of the stator vane, and     disposing in said feather seal slot a feather seal member which does not extend to the trailing edge of the platform;

forming a cooling passage on the interior of the platform of the second vane which includes a leg extending across the platform adjacent the trailing edge;

forming an exit conduit for ducting cooling air from the second vane under operative conditions and orienting the conduit so that flow under operative conditions in the exit conduit impinges on the suction side of the platform of the first vane and continues rearwardly to form a stream of cooling air directed at an adjacent downstream structure and which penetrates any downstream boundary layers to provide film cooing to the downstream structure.

13. The method for forming a cooling passage in the turbine section of a rotary machine of claim 12 wherein a rail extends radially from each of the platforms of said vanes and wherein said feather seal slot is a first feather seal slot and the step of forming a feather seal slot includes the step of forming a second, radially extending feather seal slot in the rail which extends in a spanwise direction, the second feather seal slot intersecting the first feather seal slot; and wherein the step of disposing a feather seal member includes disposing a feather seal member having a first leg which is disposed in said portion of the feather seal slot which extends rearwardly and having a second leg which extends radially, which is integral with the first leg and which is disposed in the second feather seal slot trapping the feather seal member in the axial direction.

14. The method for forming a cooling passage in the turbine section of a rotary machine of claim 12 wherein the method of forming the feather seal slot includes blocking the end of the feather seal slot to axially trap the feather seal member in the feather seal slot to block the feather seal member from entering the extension of the feather seal slot under operative conditions.

15. The method for forming a cooling passage in the turbine section of a rotary machine of claim 12 wherein said leg is a rear leg having an entrance and wherein the step of forming the exit conduit includes forming an exit conduit having an area which is seven to fifteen percent of the cross sectional flow area of the trailing edge passage adjacent the entrance to the rear leg.

16. The method for forming a cooling passage in the turbine section of a rotary machine of claim 12 wherein the extension of the slot extends in the suction side of the platform of said second vane.

17. The method for forming a cooling passage in the turbine section of a rotary machine of claim 12 wherein the extension of the slot extends in the pressure side of the platform of said first vane.

18. The method for forming a cooling passage in the turbine section of a rotary machine of claim 12 wherein the extension of the slots extends in both the suction side of the platform of said second vane and in the pressure side of the platform of said first vane.

19. A method for cooling a turbine section of a rotary machine having a working medium flowpath, the turbine section including an array of coolable stator vanes, each stator vane having an airfoil extending radially outwardly into the working medium flowpath, the airfoil having a leading edge, a trailing edge and flow directing surfaces which extend between the edges and which include a suction surface and a pressure surface, the stator vane having a platform which bounds the working medium flowpath which has a suction side, a pressure side, a leading edge region and a trailing edge region, comprising forming a first stator vane and a second stator vane adjacent to each other, each having a platform, which includes forming a serpentine passage in each vane for ducting cooling air rearwardly in the trailing edge region of the vane, the passage having a laterally extending rearmost pass which extends between the suction side and the pressure side;

forming a feather seal slot which extends rearwardly in the pressure side and the suction side of the platform of each of the stator vanes and forming an extension by continuing the slots to the trailing edge of the stator vanes, and forming a radially extending second feather seal slot in the rail extending from the platform of each of the stator vanes which extends in the spanwise direction, the second feather seal slot intersecting the first feather seal slot;

disposing a feather seal member which has a first leg disposed in the adjacent first feather seal slots, the first leg not extending to the trailing edge of the platform and a second leg which is integral with the first leg which extends radially and is disposed in the second feather seal slots trapping the feather seal member in the axial direction;

forming an exit conduit for ducting cooling air from the first vane under operative conditions and directing the slot so that flow under operative conditions through the exit conduit impinges on the suction side of the platform of the second vane and continues rearwardly in the extensions of the feather seal slots to form a stream of cooling air directed at an adjacent downstream structure to provide film cooling to the downstream structure.

\* \* \* \* \*